(12) United States Patent
Horiuchi et al.

(10) Patent No.: US 9,370,005 B2
(45) Date of Patent: Jun. 14, 2016

(54) RELAY STATION, BASE STATION, AND BAND FREQUENCY ALLOCATION METHOD

(75) Inventors: Ayako Horiuchi, Kanagawa (JP); Akihiko Nishio, Osaka (JP); Koji Yamamoto, Kyoto (JP); Tomohiko Mimura, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 107 days.

(21) Appl. No.: 14/355,747

(22) PCT Filed: Mar. 16, 2012

(86) PCT No.: PCT/JP2012/001856
§ 371 (c)(1),
(2), (4) Date: May 1, 2014

(87) PCT Pub. No.: WO2013/069170
PCT Pub. Date: May 16, 2013

(65) Prior Publication Data
US 2014/0293867 A1  Oct. 2, 2014

(30) Foreign Application Priority Data

Nov. 7, 2011  (JP) .................................. 2011-243347

(51) Int. Cl.
*H04B 7/14*  (2006.01)
*H04J 1/10*  (2006.01)
(Continued)

(52) U.S. Cl.
CPC ....... *H04W 72/0453* (2013.01); *H04B 7/15528* (2013.01); *H04W 16/14* (2013.01); *H04W 16/26* (2013.01); *H04W 16/06* (2013.01); *H04W 84/047* (2013.01)

(58) Field of Classification Search
CPC ..... H04B 7/2606; H04B 7/155; H04W 88/04; H04W 16/26; H04L 2001/0097
USPC .......................................................... 370/315
See application file for complete search history.

(56) References Cited

U.S. PATENT DOCUMENTS

| 2006/0183502 A1 | 8/2006 | Jeong et al. |
| 2009/0116435 A1* | 5/2009 | Koorapaty et al. . H04L 27/2601 370/329 |

(Continued)

FOREIGN PATENT DOCUMENTS

| CN | 101835161 A | 9/2010 |
| JP | 05-235819 A | 9/1993 |

(Continued)

OTHER PUBLICATIONS

International Search Report for Application No. PCT/JP2012/001856 dated Apr. 10, 2012.

*Primary Examiner* — Mark Rinehart
*Assistant Examiner* — Sanjay K Dewan
(74) *Attorney, Agent, or Firm* — Pearne & Gordon LLP

(57) ABSTRACT

A relay station to which network sharing is applied, wherein it is possible to appropriately allocate between multiple operators a shared band frequency shared by the multiple operators, and to improve the frequency use efficiency. In a relay station (100), a band frequency allocation determination unit (107) determines the bandwidth for each operator within a shared band frequency, which is shared by multiple operators and used between the relay station (100) and a mobile station, on the basis of the quality of a first line between the relay station (100) and the base stations of the operators and on the basis of the status of a second line between the relay station (100) and the mobile stations of the operators. A signal generation unit (108) allocates the signal of the operators to a resource on the basis of the bandwidth for each operator in the shared band frequency.

15 Claims, 12 Drawing Sheets

| BIT TRANSMITTED | 0 | 1 | 2 | 3 | 4 | 5 | 6 | 7 |
|---|---|---|---|---|---|---|---|---|
| ACTUALLY MEASURED VALUE [RATIO %] | 0~15 | 15~28 | 28~40 | 40~60 | 60~70 | 70~80 | 80~95 | 95~100 |
| REPRESENTATIVE VALUE (VALUE USED FOR CALCULATION) UPPER ROW: RATIO LOWER ROW: % | 1/8 12.5 | 1/4 25.0 | 1/3 33.3 | 1/2 50.0 | 2/3 66.6 | 3/4 75.0 | 7/8 87.5 | 1 100.0 |

(51) Int. Cl.
  *H04J 3/08*   (2006.01)
  *H04W 72/04*  (2009.01)
  *H04B 7/155*  (2006.01)
  *H04W 16/14*  (2009.01)
  *H04W 16/26*  (2009.01)
  *H04W 84/04*  (2009.01)
  *H04W 16/06*  (2009.01)

(56) References Cited

U.S. PATENT DOCUMENTS

| | | | |
|---|---|---|---|
| 2010/0203891 A1* | 8/2010 | Nagaraja et al. | H04W 36/08 455/436 |
| 2010/0233963 A1* | 9/2010 | Harada et al. | H04W 16/14 455/63.3 |
| 2010/0240388 A1 | 9/2010 | Nakatsugawa | |
| 2011/0125905 A1 | 5/2011 | Baucke et al. | |
| 2011/0286408 A1* | 11/2011 | Flore et al. | H04L 5/0007 370/329 |
| 2012/0230250 A1* | 9/2012 | Kasslin et al. | H04W 72/1215 370/328 |
| 2012/0314569 A1* | 12/2012 | Liu et al. | H04W 36/0094 370/230 |
| 2013/0163508 A1* | 6/2013 | Yu et al. | H04W 16/14 370/315 |
| 2014/0341179 A1* | 11/2014 | Yokomakura et al. | H04L 5/0037 370/330 |
| 2015/0195032 A1* | 7/2015 | Sharma et al. | H04B 7/15557 370/315 |

FOREIGN PATENT DOCUMENTS

| | | | |
|---|---|---|---|
| JP | 2006-174447 A | 6/2006 | |
| JP | 2008-523701 A | 7/2008 | |
| JP | 2010-233202 A | 10/2010 | |
| JP | 2011-508474 A | 3/2011 | |
| WO | 2006/062338 A1 | 6/2006 | |
| WO | 2009/072191 A1 | 6/2009 | |
| WO | WO 2012028200 A1 * | 3/2012 | H04W 16/14 |

* cited by examiner

| | eNB-RN RSRP (Channel QUALITY) | NUMBER OF (ACTIVE) UEs | SYSTEM BANDWIDTH |
|---|---|---|---|
| eNB(OP1)-RN | -95dBm | 5 | 20MHz |
| eNB(OP2)-RN | -100dBm | 10 | 10MHz |
| eNB(OP3)-RN | -105dBm | 6 | 20MHz |

FIG. 8

| | eNB-RN RSRP (CHANNEL QUALITY) | DIFFERENCE FROM LOWEST QUALITY [dB VALUE, TRUE VALUE] | REPORTED VALUE (RATIO) |
|---|---|---|---|
| eNB(OP1)-RN | -95dBm | 10 dB, 10 TIMES | 10/14 |
| eNB(OP2)-RN | -100dBm | 5 dB, APPROXIMATELY 3 TIMES | 3/14 |
| eNB(OP3)-RN | -105dBm | 0 dB, 1 TIME | 1/14 |

FIG. 9

| SIGNALING INFORMATION | RATIO OF eNB-RN RSRP (CHANNEL QUALITY) | RATIO OF NUMBER OF (ACTIVE) UEs (TRAFFIC RATIO) | RATIO OF eNB-RN SYSTEM BANDWIDTH |
|---|---|---|---|
| OP1 | 10/14 | 5/21 | 20/50 |
| OP2 | 3/14 | 10/21 | 10/50 |
| OP3 | 1/14 | 6/21 | 20/50 |
| REPORTING FREQUENCY | HIGH | MEDIUM | LOW |

FIG. 10

| BIT TRANSMITTED | 0 | 1 | 2 | 3 | 4 | 5 | 6 | 7 |
|---|---|---|---|---|---|---|---|---|
| ACTUALLY MEASURED VALUE [RATIO %] | 0~15 | 15~28 | 28~40 | 40~60 | 60~70 | 70~80 | 80~95 | 95~100 |
| REPRESENTATIVE VALUE (VALUE USED FOR CALCULATION) UPPER ROW: RATIO LOWER ROW % | 1/8 | 1/4 | 1/3 | 1/2 | 2/3 | 3/4 | 7/8 | 1 |
| | 12.5 | 25.0 | 33.3 | 50.0 | 66.6 | 75.0 | 87.5 | 100.0 |

FIG. 12

RELAY STATION, BASE STATION, AND BAND FREQUENCY ALLOCATION METHOD

TECHNICAL FIELD

The present invention relates to a relay station, a base station, and a method for allocating a band.

BACKGROUND ART

In recent years, the transmission of large-volume data such as still image data and moving image data in addition to audio data has become common in cellular mobile communication systems along with increasing use and development of multimedia information. In order to achieve large-volume data transmission, active studies have been carried out on techniques for achieving a high transmission rate using a broad radio band, a MIMO (Multiple-Input Multiple-Output) transmission technique and an interference control technique.

LTE-Advanced (Long Term Evolution Advanced) for which introduction of the aforementioned technique is being studied aims at high speed downlink communication using a maximum of 1 Gbps and requires a communication system that achieves high throughput and is excellent in frequency utilization efficiency. LTE-Advanced promotes implementation of high throughput of a cellular network and improvement of frequency utilization efficiency.

In order to expand a range (coverage area) where high throughput is supported, studies have been carried out on a relay technique that involves placement of a radio communication relay station apparatus (hereinafter, abbreviated as "relay station" or RN (Relay Node)) between a radio communication base station (hereinafter, abbreviated as "base station" or "eNB") and a radio communication mobile station apparatus (hereinafter, abbreviated as "mobile station" or "UE (User Equipment)") and that performs communication between the base station and the mobile station via the relay station (e.g., see PTL 1). The use of relay technique allows even a mobile station that cannot directly communicate with a base station to perform communication via a relay station.

In LTE-Advanced, studies have been carried out on a mobile relay technique that involves installation of a relay station on a train, bus or the like. According to the mobile relay technique, since a mobile station connected to a mobile relay which is a relay station moves together with the vehicle, the mobile relay, instead of the mobile station, performs mobile control such as handover with a base station (Donor eNB: DeNB) to which the mobile relay is connected during the ride on the vehicle. Thus, the mobile station need not perform its own mobile control and thereby can reduce signaling traffic associated with the mobile control.

Meanwhile, network sharing has been attracting attention, which allows a network to be shared among a plurality of operators in order to reduce device costs (e.g., see PTL 2). In network sharing, devices such as a base station (eNB) and mobile station (UE) or the frequency band is shared among operators. Network sharing is expected to enable active and efficient use of finite resources such as the frequency band.

CITATION LIST

Patent Literature

PTL 1
WO 2009/072191
PTL 2
Japanese Patent Application Laid-Open No. 2006-174447

SUMMARY OF INVENTION

Technical Problem

Studies have been carried out so far on a band allocation method for connecting a plurality of relay stations to a base station. However, each relay station is connected to only one base station or (one or a plurality of) base stations of a single operator. On the other hand, mobile stations belong to various operators, respectively. Thus, in order for all mobile stations within an area of a relay station to use the relay station, it is necessary for the operators to individually install their respective relay stations.

However, it is not efficient for a plurality of operators to individually install their respective relay stations from the standpoint of a reduction in device costs or environmental protection in addition to a disadvantage in installation space. In particular, a mobile relay installed on a train, bus or the like requires a reduction in device costs.

In this respect, the network sharing technique may be applied to a relay station in order to allow a plurality of operators to share the relay station.

FIGS. 1A to 1C show examples of a method of sharing a band between a relay station and mobile stations when a plurality of operators share the relay station. In FIGS. 1A to 1C, a base station (eNB) of operator i is represented by eNB (OPi) and a mobile station (UE) of operator i is represented by UE (OPi). FIG. 1 illustrates a case where two operators (OPi. i=1, 2) share a relay station (RN).

As shown in FIG. 1A, when the relay station (RN) is shared, communication on all links (between eNB (OPi) and RN, eNB (OPi) and UE (OPi) and RN and UE (OPi)) may be carried out using only a dedicated band of each operator (dedicated band scheme). That is, in the dedicated band scheme, as shown in FIG. 1C, a band of the relay station (band used between RN and UE, 20 MHz) is allocated to eNB (OP1) and eNB (OP2), 10 MHz each. In FIG. 1A, each operator can perform scheduling of the dedicated band of the operator independently of band allocation of the other operator. Note that this method is equivalent to a situation where each operator individually installs a relay station with an equal antenna gain.

On the other hand, when a relay station (RN) is shared as shown in FIG. 1B, communication between RN and UE (OPi) may be carried out using a band shared among a plurality of operators (called "shared band") (shared band scheme). That is, in the shared band scheme, the band of the relay station (band used between RN and UE, 20 MHz) is shared between eNB (OP1) and eNB (OP2) as shown in FIG. 1C. As shown in FIG. 1B, sharing the band of the relay station by the operators provides a degree of freedom for the allocation of a band used between RN and UEs. For example, when a required band of one operator is small, the other operator can use an available band between RN and UEs. Accordingly, the operators are allowed to more flexibly utilize the limited band available for the operators compared to the method illustrated in FIG. 1A (dedicated band scheme).

However, in the shared band scheme shown in FIG. 1B, it is necessary to adjust usage of the relay station among operators (that is, appropriate distribution of the shared band). Particularly, if the resource amount available between the relay station and mobile stations is not adjusted beforehand, it is not possible to determine the resource amount between the base station of each operator and the relay station.

Hereinafter, the method of adjusting the resource amount available between the relay station (RN) and mobile stations (UE (OPi)) (shared band allocation method) will be described.

For example, as one of such shared band allocation methods, a shared band may be allocated based on channel quality between the relay station and the base station (eNB (OPi)) of each operator. This allows the relay station to allocate resources (shared band allocation) based on the amount of data received from each operator. In this method, however, there may be a case where data cannot be transmitted appropriately depending on the channel condition between the relay station and mobile station.

For example, a case shown in FIG. 1B will be described where channel quality between eNB (OP1) and RN is on the same level as channel quality between eNB (OP2) and RN, and the same bandwidth is allocated as the band used between RN and UE (OP1) and the band used between RN and UE (OP2). In this case, if the channel condition between RN and UE (OP1) (e.g., channel quality) is poor, a larger bandwidth is necessary to secure receiving quality between RN and UE (OP1). In contrast, in the case where the channel condition (e.g., channel quality) between RN and UE (OP2) is good, the amount of data decreases, for example, by increasing the modulation level, which in turn allows a reduction in the required bandwidth between RN and UE (OP2). Thus, for OP1, the allocated shared band may be narrower than the actually necessary band (required bandwidth), the amount of data received from eNB (OP1) may become too large for the shared band allocated to OP1, preventing RN from transmitting all the data to UE (OP1). On the other hand, for OP2, since the shared band allocated to OP2 becomes wider than the actually necessary band (required band), the amount of data received from eNB (OP2) becomes too small compared to the shared band allocated to OP2. Thus, the shared band allocated to OP2 may be left over, which causes deterioration in the frequency utilization efficiency.

Another possible shared band allocation method is to allocate a shared band based on the channel condition (e.g., channel quality) between the relay station and a mobile station of each operator. This allows the relay station to allocate a resource (allocate a shared band) based on a channel condition between the relay station and the mobile station. In this method, however, the amount of data from each operator determined based on channel quality between the base station (eNB (OPi)) and relay station is not considered. For this reason, as described above, there may be a case where the amount of data received from each operator is too large for a shared band allocated to each operator to transmit all the data to the mobile station, or a case where the amount of data received from each operator is too small for a shared band allocated to each operator, which causes resources between the relay station and mobile station to be left over and deterioration in the frequency utilization efficiency.

An object of the present invention is to provide a relay station, a base station and a method for allocating a band that enable appropriate allocation of a shared band to be shared among a plurality of operators to a plurality of operators and an improvement in the frequency utilization efficiency in a relay station to which network sharing is applied.

Solution to Problem

A relay station according to an aspect of the present invention is a relay station that is shared among a plurality of operators and that relays signals communicated between base stations and mobile stations of the plurality of operators, the relay station including: a band allocation determining section that determines a bandwidth for each of the operators in a shared band which is a band used between the relay station and the mobile stations and which is shared among the plurality of operators, based on quality of a first channel between the relay station and the base station of each of the operators and a condition of a second channel between the relay station and the mobile station of each of the operators; and a signal generation section that generates signals of the plurality of operators based on the bandwidths for the respective operators in the shared band.

A base station according to an aspect of the present invention is a base station that communicates with a relay station configured to relay signals communicated between base stations and mobile stations of a plurality of operators and to be shared among the plurality of operators, the base station including: a band allocation determining section that determines a bandwidth for each of the operators in a shared band which is a band used between the relay station and the mobile stations and which is shared among the plurality of operators, based on quality of a first channel between the relay station and the base station of each of the operators and a condition of a second channel between the relay station and the mobile station of each of the operators; and a signal generation section that generates signals based on the bandwidths for the respective operators in the shared band.

A method for allocating a band according to an aspect of the present invention is a method for allocating a band used to relay signals communicated between base stations and mobile stations of a plurality of operators, the method including: determining a bandwidth for each of the operators in a shared band which is a band used between the relay station and the mobile stations and which is shared among the plurality of operators, based on quality of a first channel between the relay station and the base station of each of the operators and a condition of a second channel between the relay station and the mobile station of each of the operators; and generating signals of the plurality of operators based on the bandwidths for the respective operators in the shared band.

Advantageous Effects of Invention

According to the present invention, it is possible to appropriately allocate a shared band to be shared among a plurality of operators to a plurality of operators and to improve the frequency utilization efficiency in a relay station to which network sharing is applied.

BRIEF DESCRIPTION OF DRAWINGS

FIG. 8 illustrates an example of information of each operator according to Embodiment 2 of the present invention;

FIG. 9 illustrates a method of calculating a ratio of channel quality of each operator according to Embodiment 2 of the present invention;

FIG. 10 illustrates a ratio of information of each operator according to Embodiment 2 of the present invention;

FIG. 12 is a diagram provided for describing signaling according to another embodiment of the present invention.

DESCRIPTION OF EMBODIMENTS

Figure 1A:
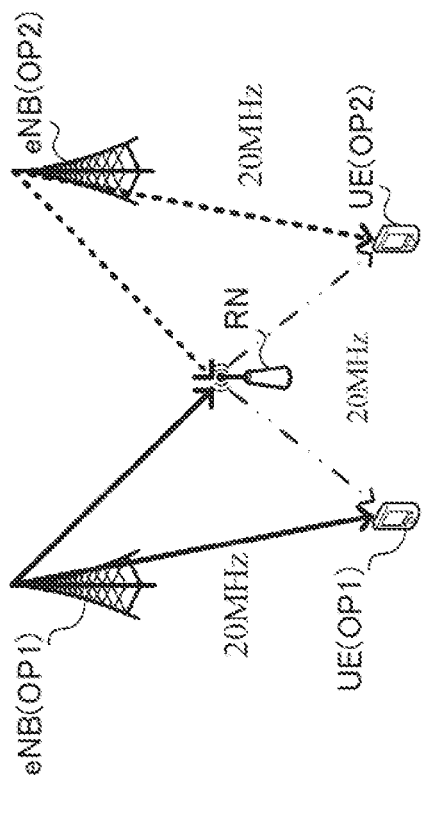
FIGS. 1A to 1C illustrate examples of a method of sharing a relay station.

Hereinafter, embodiments of the present invention will be described in detail with reference to the accompanying drawings. Throughout the embodiments, the same elements are assigned the same reference numerals and any duplicate description of the elements is omitted.

Figure 1B:
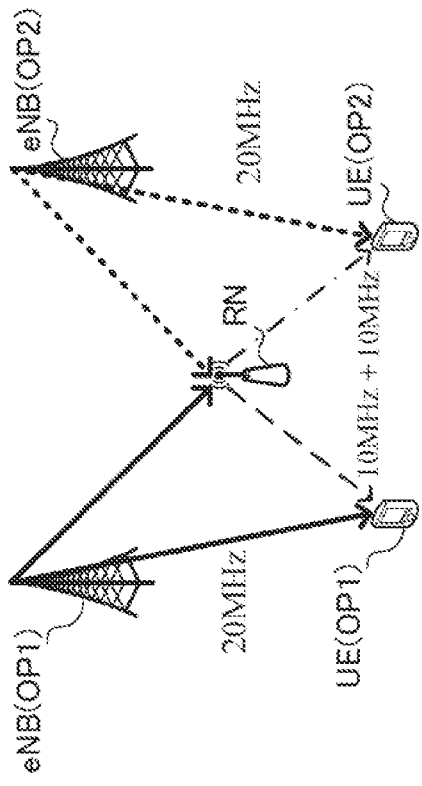
Figure 1C:
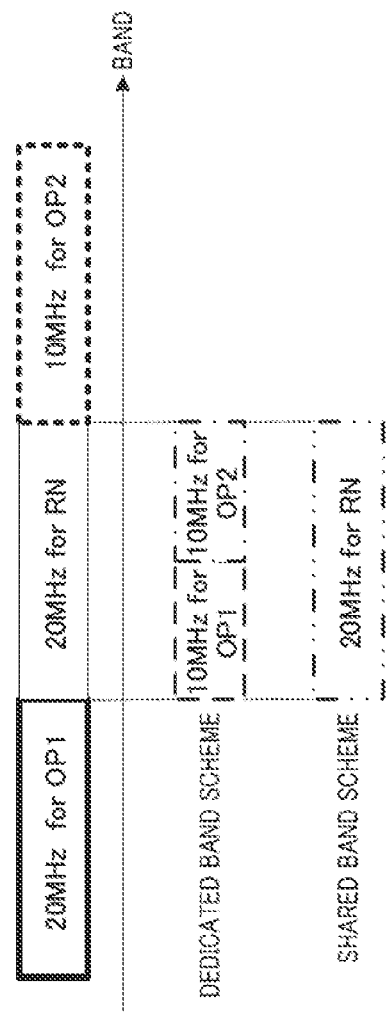

In the following description, base stations (eNB (OPi)) of a plurality of operators i share (network sharing) a band with a relay station (RN) and mobile stations (UE (OPi)) as shown in FIG. 1B.

The following two methods are available as a transmission scheme from a base station to a mobile station when each operator uses a relay station.

(1) Relay Transmission Only

In the case of relay transmission only, frequency utilization efficiency can be improved by using a high-gain antenna of the relay station (RN). On the other hand, when a plurality of operators perform relay transmission in the case where there is a limitation on the band between the relay station (RN) and mobile station (UE), the transmission rate between the relay station (RN) and mobile station (UE) sometimes acts as a bottleneck, making it impossible to obtain sufficient throughput.

(2) Combination of Direct Transmission and Relay Transmission

Even when the transmission rate between the relay station (RN) and mobile station (UE) acts as a bottleneck, it is possible to improve the throughput by assigning a dedicated band of each operator to both direct transmission and relay transmission.

Hereinafter, a description will be thus given of a case where as shown in FIG. 1B, each operator uses direct transmission (direct communication between eNB (OPi) and UE) and relay transmission (communication via RN) in combination.

[Configuration of Communication Apparatus 500]

Figure 2:
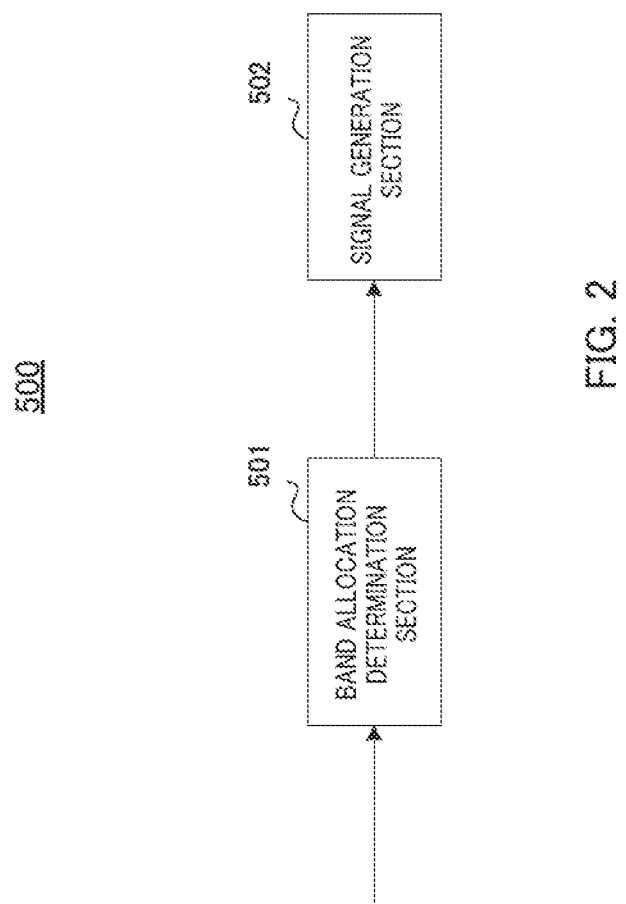
FIG. 2 is a block diagram illustrating a configuration of a communication apparatus according to Embodiment 1 of the present invention.

FIG. 2 is a block diagram illustrating a configuration of communication apparatus 500 according to Embodiment 1 of the present invention.

In communication apparatus 500, band allocation determining section 501 determines a bandwidth for each operator in a shared band which is a band used between the relay station and mobile station and is shared among a plurality of operators based on quality of a first channel between the relay station and base station of each operator and a condition of a second channel between the relay station and mobile station of each operator. Signal generation section 502 generates signals of a plurality of operators based on bandwidths for the respective operators in the shared band.

Note that the configuration of communication apparatus 500 in FIG. 2 may be provided inside the relay station or base station.

[Embodiment 1]

[Configuration of Relay Station 100]

Figure 3:
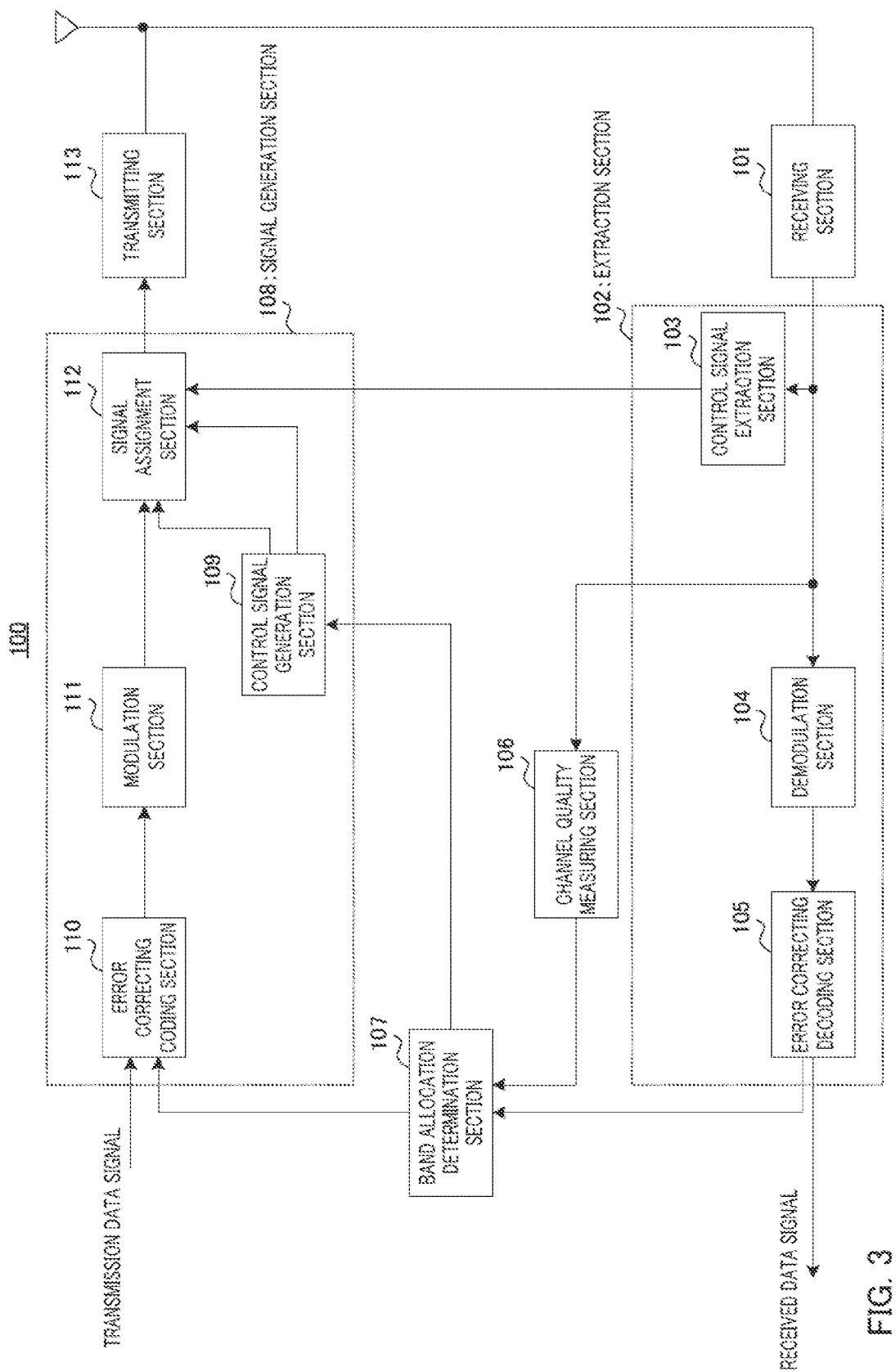
FIG. 3 is a block diagram illustrating a configuration of a relay station according to Embodiment 1 of the present invention.

Relay station 100 is shared among a plurality of operators and relays a signal communicated between the base stations and mobile stations of the plurality of operators. FIG. 3 is a block diagram illustrating a configuration of relay station 100 according to the present embodiment.

In FIG. 3, receiving section 101 receives a signal transmitted from base station 200 or mobile station via an antenna, applies reception processing such as down-conversion, and outputs the resultant signal to extraction section 102 (control signal extraction section 103 and demodulation section 104) and channel quality measuring section 106.

Extraction section 102 extracts a data signal, control signal or reference signal from the signal inputted from receiving section 101. Extraction section 102 includes control signal extraction section 103, demodulation section 104, and error correcting decoding section 105.

Control signal extraction section 103 extracts a control signal from the signal transmitted from base station 200 (that is, downlink (DL) signal) among signals inputted from receiving section 101. Control signal extraction section 103 outputs a control signal for uplink (UL) assignment to signal generation section 108 (signal assignment section 112) among the extracted control signals.

Demodulation section 104 applies demodulation processing to the signal inputted from receiving section 101 and outputs the demodulated signal to error correcting decoding section 105.

Error correcting decoding section 105 decodes the signal inputted from demodulation section 104 to obtain a received data signal and a control signal. The control signal thus obtained in error correcting decoding section 105 includes channel information and band information. The channel information includes, for example, channel quality (e.g., frequency utilization efficiency) between base station 200 of operator i (eNB (OPi)) and a mobile station (UE (OPi)) of operator i. The band information includes a dedicated bandwidth occupied by base station 200 of operator i. Error correcting decoding section 105 outputs the received data signal obtained to a subsequent functional section. Error correcting decoding section 105 outputs the obtained channel information and band information to band allocation determining section 107.

Channel quality measuring section 106 measures channel quality between each base station 200 (eNB (OPi)) and relay station 100 (RN), and channel quality between relay station 100 (RN) and each mobile station using a reference signal included in the signal inputted from receiving section 101 (signal from base station 200 or mobile station). Channel quality measuring section 106 also calculates frequency utilization efficiency between each base station 200 (eNB (OPi)) and relay station 100 (RN), and frequency utilization efficiency between relay station 100 (RN) and each mobile station using the measurement result and outputs the calculation result to band allocation determining section 107. Note that channel quality measuring section 106 may also acquire channel quality between relay station 100 (RN) and each mobile station according to a channel quality report from each mobile station instead of measuring channel quality between relay station 100 (RN) and each mobile station. In this case, the channel quality report from each mobile station is extracted by extraction section 102 from the signal from the mobile station.

Band allocation determining section 107 determines a bandwidth for each operator in a frequency band shared among a plurality of operators (shared band) between relay station 100 and a mobile station of each operator based on the bandwidth indicated in band information and channel quality (frequency utilization efficiency) of each link (between base station 200 and relay station 100, between relay station 100 and mobile station and between base station 200 and a mobile station) indicated in channel information and the information inputted from channel quality measuring section 106. Band allocation determining section 107 outputs information indicating a bandwidth of each link including the determined bandwidth (allocated bandwidth information) to signal generation section 108 (control signal generation section 109 and error correcting coding section 110). Band allocation determining section 107 outputs frequency utilization efficiency (or channel quality) on each link of each operator to signal generation section 108 (control signal generation section 109). Here, allocated bandwidth information is generated for each operator or base station 200 (eNB). The details of band allocation determination processing in band allocation determining section 107 will be described later.

Signal generation section 108 generates a data signal and a control signal, and assigns each signal to a corresponding resource. Signal generation section 108 includes control signal generation section 109, error correcting coding section 110, modulation section 111, and signal assignment section 112.

Control signal generation section 109 determines a resource amount and resource position (position of an RB (Resource Block) allocated to a mobile station (UE) using the bandwidth and frequency utilization efficiency (or channel quality) specified by band allocation determining section 107. Control signal generation section 109 generates a control signal including allocated resource information indicating the determined information and outputs the control signal to signal assignment section 112 as data. Control signal generation section 109 outputs the control signal to signal assignment section 112 as a resource allocation instruction.

Error correcting coding section 110 receives a transmission data signal and the allocated bandwidth information as input, performs error correcting coding on the inputted transmission data signal and allocated bandwidth information and outputs the coded signal (data signal) to modulation section 111.

Modulation section 111 applies modulation processing to the signal received from error correcting coding section 110 and outputs the modulated signal to signal assignment section 112.

In the case of transmission to a mobile station (UE) (during DL transmission), signal assignment section 112 assigns the signal inputted from modulation section 111 (DL signal), the signal inputted from control signal generation section 109 (including allocated resource information) to corresponding resources and outputs the assigned signals to transmitting section 113. More specifically, the control signal including the allocated resource information is assigned to a control signal region and the data signal is assigned to a resource based on the control signal inputted from control signal generation section 109 (resource allocation instruction, that is, information including a bandwidth for each operator in the shared band determined in band allocation determining section 107). On the other hand, in the case of transmission to base station 200 (during UL transmission), signal assignment section 112 assigns the signal inputted from modulation section 111 (UL signal) to a resource based on the control signal (UL allocation instruction) inputted from control signal extraction section 103 and outputs the assigned signal to transmitting section 113.

Transmitting section 113 applies transmission processing such as up-conversion to the input signal and transmits the resultant signal via an antenna.

[Configuration of Base Station 200]

Figure 4:
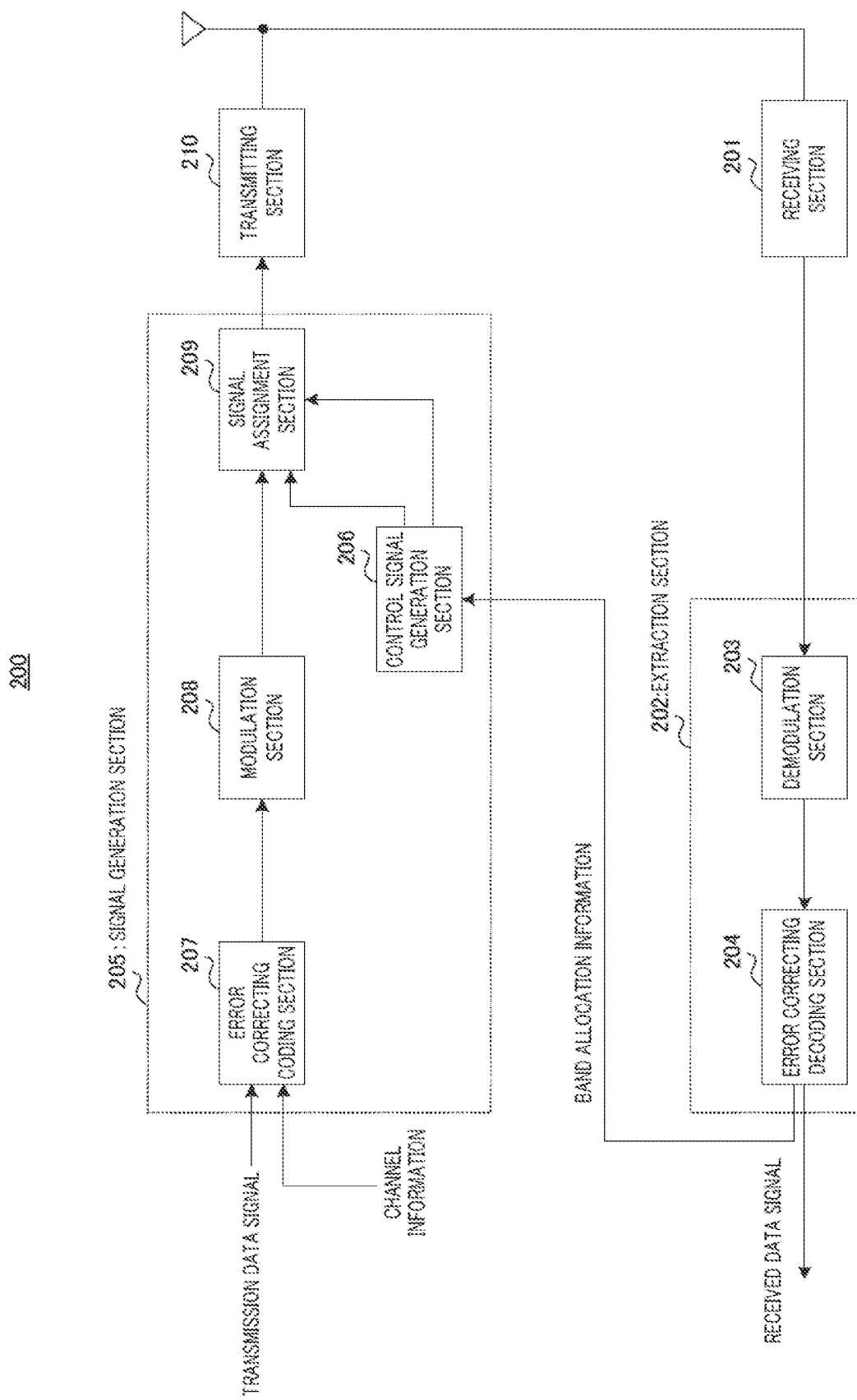
FIG. 4 is a block diagram illustrating a configuration of a base station according to Embodiment 1 of the present invention.

FIG. 4 is a block diagram illustrating a configuration of base station 200 according to the present embodiment.

In FIG. 4, receiving section 201 receives a signal transmitted from relay station 100 or mobile station via an antenna, applies reception processing such as down-conversion thereto and then outputs the resultant signal to extraction section 202 (demodulation section 203).

Extraction section 202 extracts a data signal and control signal from the signal inputted from receiving section 201. Extraction section 202 includes demodulation section 203 and error correcting decoding section 204.

Demodulation section 203 demodulates the signal inputted from receiving section 201 and outputs the demodulated signal to error correcting decoding section 204.

Error correcting decoding section 204 performs error correcting decoding on the demodulated signal inputted from demodulation section 203, outputs a received data signal and also outputs band allocation information included in the control signal obtained to signal generation section 205 (control signal generation section 206). This band allocation information includes allocated bandwidth information which is information indicating a bandwidth of each link of base station 200.

Signal generation section 205 generates a data signal and a control signal, and allocates each signal to a corresponding resource. Signal generation section 205 includes control signal generation section 206, error correcting coding section 207, modulation section 208, and signal assignment section 209.

Control signal generation section 206 calculates the amount of traffic transmittable to each link based on the bandwidth indicated by the allocated bandwidth information and frequency utilization efficiency (or channel quality) indicated by the channel information. Control signal generation section 206 determines the resource amount allocated to each of the links and channel (RB) to be used in accordance with the calculated amount of traffic. Control signal generation section 206 generates a control signal including the allocated resource information indicating the determined information and outputs the control signal to signal assignment section 209 as data. Control signal generation section 206 also outputs the control signal as an instruction for downlink (DL) resource allocation to signal assignment section 209.

Error correcting coding section 207 receives a transmission data signal and channel information (including frequency utilization efficiency and bandwidth) as input, applies error correcting coding to the transmission data signal and channel information and outputs the coded signal (data signal) to modulation section 208.

Modulation section 208 modulates the signal inputted from error correcting coding section 207 and outputs the modulated signal to signal assignment section 209.

Signal assignment section 209 assigns the signal inputted from modulation section 208 and the control signal inputted from control signal generation section 206 to corresponding resources and outputs the assigned signals to transmitting section 210. More specifically, the control signal is assigned to the control signal region and the data signal is assigned to a resource based on the control signal (instruction for resource allocation) inputted from control signal generation section 206.

Transmitting section 210 applies transmission processing such as up-conversion to the input signal and transmits the resultant signal.

[Operations of Relay Station 100 and Base Station 200]

Operations of relay station 100 and base station 200 configured as described above will be described.

When the band is shared among operators, a method of allocating the shared band that takes into consideration fairness among the operators needs to be considered. The present embodiment uses a "bargaining game" as an interaction evaluation technique among a plurality of competing subjects (that is, operators) in performing band allocation taking fairness into consideration. In the bargaining game, when a plurality of subjects such as operators which make a decision based on personal rationality reach a certain binding agreement (cooperation), points of agreement of negotiation are evaluated. In the bargaining game, a Nash bargaining solution is known as a method of setting points of agreement of negotiation which takes into consideration both fairness of opportunity and Pareto optimality for the plurality of subjects. Thus, the present embodiment finds a Nash bargaining solution in the bargaining game in order to find a solution to appropriate band allocation among the operators.

[Bargaining Game]

The bargaining game determines points of agreement of negotiation when a plurality of competing decision-making subjects (players) reach a certain binding agreement (cooperation). In this bargaining game, "u" represents a feasible set of gains of the respective players, "$X_i$" represents a gain of a player i (i=1, ..., N) achieved at the time of breakdown of negotiation, and $X=(X_1, \ldots, X_i, \ldots, X_N)$ represents a reference point of negotiation. In this bargaining game, a negotiation problem is expressed by a pair (u, X) of the feasible set u and reference point X.

The bargaining game finds points of agreement of negotiation for a negotiation problem (u, X). Using gain of player i, a point of agreement of negotiation is expressed as $\eta = (\eta_1, \ldots, \eta_i, \ldots \eta_N)$.

As a method of setting a point of agreement of negotiation $\eta$, a Nash bargaining solution is known which takes into consideration Pareto optimality and fairness of opportunity among players, and expressed by following expression 1.

(Expression 1)

$$\eta = \underset{x \in u}{\operatorname{argmax}} \prod_{i=1}^{N} (x_i - X_i) \quad [1]$$

As shown in expression 1, Nash bargaining solution $\eta$ is a point that maximizes the product of gain differences among players from reference point of negotiation X ($x_i - X_i$ for player i, where $x_i$ is the gain of player i) within the feasible set. The product of gain differences among the players in this case is called "Nash product."

[Scheduling Using Nash Bargaining Solution]

Finding a solution to fair and efficient band allocation among operators (players) is equivalent to calculating a Nash bargaining solution in the bargaining game. That is, band allocation determining section 107 of relay station 100 determines a band of each link of each operator by finding a Nash bargaining solution.

Hereinafter, an example of bandwidth to be set for each operator will be described.

Regarding operator i, let us suppose that $B_i$=20 MHz is provided as a dedicated band allocatable to a link between base station 200 (eNB (OPi)) and relay station 100 (RN) (between eNB and RN) and a link between base station 200 (eNB (OPi)) and mobile station (UEs(OPi)) (between eNB and UE).

In addition, when a band between relay station 100 (RN) and mobile station (UE) (between RN and UE) is shared among a plurality of operators, C=20 MHz is provided as the shared band. Furthermore, when a band between RN and UE is not shared, an independent frequency bandwidth $D_i$=10 MHz is provided. In this case, it is assumed that both C and Di are dedicated bands between RN and UE.

Figure 5:
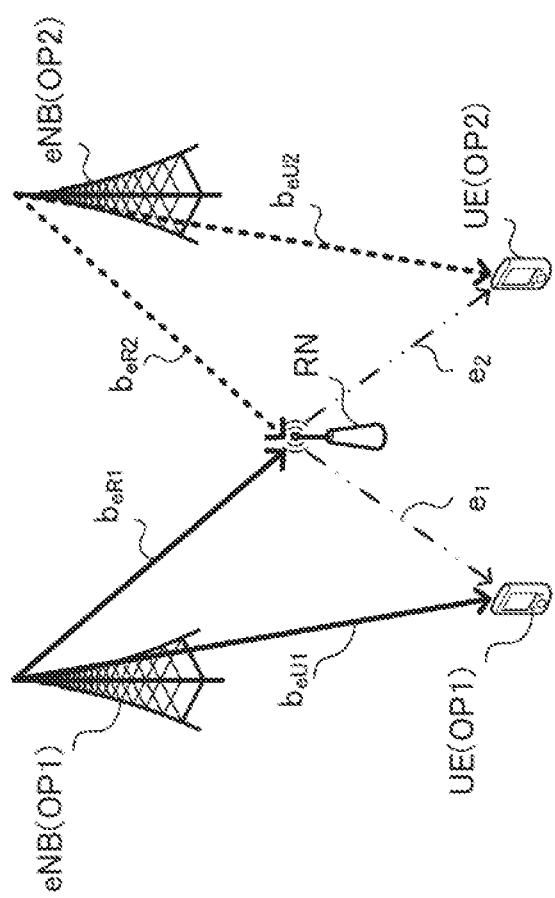
FIG. 5 is a diagram provided for describing band allocation according to Embodiment 1 of the present invention.

As shown in FIG. 5, the bandwidth allocated by operator i between eNB and UE is $b_{eUi}$ and the bandwidth allocated between eNB and RN is $b_{eRi}$ among dedicated bandwidths $B_i$. In addition, when a band is shared between RN and UE, the bandwidth of shared bandwidth C allocated to operator i is $e_i$. In this case, the relationship in following expression 2 holds true between values of the respective bandwidths.

[2]

$$b_{eUi} + b_{eRi} \leq B_i$$

$$e_1 + e_2 \leq C$$

$$e_i \leq D_i \quad \text{(Expression 2)}$$

That is, in FIG. 5, relationships $b_{eU1} + b_{eR1} \leq 20$ MHz, $b_{eU2} + b_{eR2} \leq 20$ MHz and $e_1 + e_2 \leq 20$ MHz hold true.

Regarding operator i, frequency utilization efficiency between eNB and UE is denoted by $\eta_{eUi}$, frequency utilization efficiency between eNB and RN is denoted by $\eta_{eRi}$ and frequency utilization efficiency between RN and UE is denoted by $\eta_{RUi}$. In this case, throughput $t_i$ obtained by operator i is expressed by following expression 3.

[3]

$$t_i = \eta_{eUi} \cdot b_{eUi} + \min(\eta_{eRi} \cdot b_{eRi}, \eta_{RUi} \cdot e_i) \quad \text{(Expression 3)}$$

The distribution of the shared band when the band is shared can be uniquely determined as a distribution such that throughput of each operator satisfies the Nash bargaining solution in the bargaining game. That is, a strategy set that maximizes the product (Nash product) of differences among operators between a reference point of negotiation and a gain in each operator is a point of agreement of negotiation in the Nash bargaining solution.

Thus, using the throughput obtained when operator i (player i) performs direct transmission without using relay station 100 (RN) (that is, a gain of player i achieved at the time of breakdown of negotiations) as reference point of negotiation $T_i$, band allocation determining section 107 of relay station 100 performs shared band allocation so as to maximize the product of amounts of throughput improvement ($x_i - T_i$). The aforementioned band allocation method in band allocation determining section 107 is formulated as shown in following expression 4.

(Expression 4)

$$\prod_{i=1}^{I} (t_i - T_i) = \max_{S} \prod_{i=1}^{I} (x_i - T_i) \quad [4]$$

In expression 4, I represents the number of operators (I=2 in FIG. 5). Furthermore, $x_i$ represents a throughput of operator i and $t_i$ represents a Nash bargaining solution. More specifically, $x_i$ represents a throughput when operator i performs communication between base station 200 (eNB (OPi)) and mobile station (UEs (OPi)) via at least relay station 100 (RN), and is calculated in the same way as $t_i$ shown in expression 3. Reference point of negotiation Ti is a throughput when operator i performs communication between base station 200 (eNB (OPi)) and mobile station (UEs (OPi)) without relay station 100 (RN), and is calculated according to following expression 5.

[5]

$$T_i = \eta_{eUi} \cdot B_i \quad \text{(Expression 5)}$$

In expression 4, vector S is an allocation bandwidth vector including an allocation bandwidth of each link ($b_{eRi}$ between eNB and RN, $b_{eUi}$ between eNB and UE, and $e_i$ between RN and UE of operator i), and is defined as shown in following expression 6. However, these bandwidths shown in expression 6 take values that satisfy expression 2.

[6]

$$S = (b_{eU1}, b_{eR1}, b_{eU2}, b_{eR2}, e_1, e_2) \quad \text{(Expression 6)}$$

[Signaling]

As described above, in the present embodiment, relay station 100 calculates a Nash bargaining solution and determines a bandwidth of each link (bandwidth making up vector S shown in Expression 6). In this case, it is necessary to gather information necessary to calculate the Nash bargaining solution into an apparatus that calculates the Nash bargaining solution (here, relay station 100). Information necessary to calculate the Nash bargaining solution is as follows.

(1) Frequency utilization efficiency between eNB and UE of operator i: $\eta_{eUi}$
(2) Frequency utilization efficiency between eNB and RN of operator i: $\eta_{eRi}$
(3) Frequency utilization efficiency between RN and UE of operator i: $\eta_{RUi}$
(4) Dedicated bandwidth for operator i: $B_i$
(5) Shared bandwidth: C Of the above-described information, $\eta_{eUi}$ and $\eta_{eRi}$ may be signaled from base station 200 (eNB (OPi)) to relay station 100 (RN) as channel information. In this case, the channel information from base station 200 is extracted by extraction section 102 from the signal from base station 200. However, signaling of $\eta_{eRi}$ can be omitted when, like the present embodiment, $\eta_{eRi}$ is predicted from the receiving quality (channel quality) measured by relay station 100 (channel quality measuring section 106).

In addition, $\eta_{eRUi}$ is predicted from a channel quality report from the mobile station (UE) or from channel quality between UE (OPi) and RN measured by relay station 100 (channel quality measuring section 106).

Since the values of such frequency utilization efficiency change depending on fluctuations in the channel condition of each link, it is preferable to update information on frequency utilization efficiency at an interval that allows the fluctuations in the channel condition to follow.

Of the above-described information, $B_i$ and C may be shared among the respective apparatuses at the beginning of communication as initial set values. However, since the bandwidth ($B_i$ and C) may differ from one operator to another in a case where the relay station 100 is a mobile relay, relay station 100 needs to check the bandwidth every time a connection is made.

The information on the frequency utilization efficiency may also be other parameters such as an SNR (Signal to Noise Ratio), SIR (Signal to Interference Ratio), SINR (Signal to Interference and Noise Ratio), CIR (Carrier to Interference Ratio), CNR (Carrier to Noise Ratio), CINR (Carrier to Interference and Noise Ratio), RSSI (Received Signal Strength Indicator), RSRP (Reference Signal Reception Power), RSRQ (Reference Signal Received Quality), MCS (Modulation and Coding Scheme) level that allows channel quality to be predicted, receiving power, interference power, error rate, and transmission rate. When there is a plurality of mobile stations (UE (OPi)) served by base station 200 (eNB (OPi)), channel quality between eNB and UE may be an average value of channel quality in the plurality of mobile stations (UE (OPi)).

Relay station 100 calculates the Nash bargaining solution using the information described above and then reports the band allocation result obtained from the Nash bargaining solution to each operator. More specifically, relay station 100 notifies base station 200 of operator i of allocation bandwidth $e_i$ of operator i out of allocation bandwidth $b_{eUi}$ between eNB and UE, allocation band $b_{eRi}$ between eNB and RN and shared bandwidth C. However, when operator i can determine the amount of traffic transmitted to relay station 100 using only $b_{eRi}$, relay station 100 may notify base station 200 of operator i of $b_{eRi}$ only.

Thus, band allocation determining section 107 of relay station 100 calculates a difference between the throughput ($x_i$ shown in Expression 4) when each operator i performs communication between base station 200 (eNB (OPi)) and mobile station (UE (OPi)) via at least relay station 100 and the throughput ($T_i$ shown in Expression 5, reference point of negotiation) when operator i performs communication between base station 200 and a mobile station without relay station 100. Band allocation determining section 107 then determines a bandwidth for each operator in the shared band that maximizes the product of respective differences of a plurality of operators (($x_i-T_i$) shown in Expression 4). That is, relay station 100 calculates a Nash bargaining solution which is a strategy set that maximizes the product of "differences in throughput (gain)" (Nash product) assuming the "reference point of negotiation" in the aforementioned bargaining game as the throughput in the case of direct transmission without relay station 100. That is, band allocation determining section 107 determines a bandwidth (b_di, b_ri, ei) of each link of each operator i in consideration of fairness among operators and so as to improve the throughput of each operator to a maximum.

Allocating bands using the Nash bargaining solution makes it possible to effectively utilize bands while maintaining fairness of opportunity among operators (that is, band allocation). This is also understandable from the fact that expression 4 is defined by a product. That is, when the benefit of one operator is extremely low, the value of the product portion in expression 4 also decreases. That is, vector S that maximizes the product portion in expression 4 becomes a value for which the benefit of each operator is set while maintaining fairness.

According to the present embodiment, relay station 100 calculates the throughput of operator i using channel quality between eNB (OPi) and RN (frequency utilization efficiency $\eta_{eRi}$) and channel quality between RN and UE (OPi) (frequency utilization efficiency $\eta_{RUi}$) when calculating the Nash negotiation solution. That is, in relay station 100, band allocation determining section 107 determines band allocation of each operator in the shared band between RN and UE using both channel quality between eNB and RN (frequency utilization efficiency) and channel quality between RN and UE (frequency utilization efficiency).

Note that, as relay station 100 (mobile relay) moves, communication quality between eNB and RN of each operator fluctuates independently. For this reason, the bandwidth required by each operator for communication between RN and UE also changes. In contrast, relay station 100 determines band allocation of each operator in the shared band based on both channel quality between eNB and RN (frequency utilization efficiency) and channel quality between RN and UE (frequency utilization efficiency). This provides a degree of freedom for band allocation between RN and UE with in accordance with the channel quality between eNB and RN, and the channel quality between RN and UE, and can improve frequency utilization efficiency in the entire system. This allows relay station 100 to which network sharing is applied to appropriately allocate, among a plurality of operators, the shared band shared among the plurality of operators and improve frequency utilization efficiency.

The present embodiment has been described with a case where relay station 100 performs calculations to determine a Nash bargaining solution. However, instead of relay station 100, base station 200 (eNB (OPi)) may perform calculations to determine a Nash bargaining solution. In this case, relay station 100 (RN) may transmit information necessary for calculations to determine a Nash bargaining solution to base station 200 (eNB (OPi)), and base station 200 (eNB (OPi)) may notify relay station 100 (RN) and base station 200 of another operator via relay station 100 (RN) of the calculation result (band allocation).

Distribution of the shared band may be determined when the band is shared further in consideration of fairness among mobile stations.

For example, distribution of the shared band when the band is shared can be uniquely determined as distribution such that the throughput of the mobile station belonging to each operator satisfies the Nash bargaining solution in the bargaining game. That is, a strategy set that maximizes the product (Nash product) of differences among mobile stations between reference points of negotiation and gains in each mobile station is a point of agreement of negotiation in the Nash bargaining solution.

Thus, as an example, the band allocation determining section of the relay station may allocate a shared band that maximizes the product of amounts of throughput improvement $(x_{ji}-T_i/N_i)$ using an average value of throughput $T_i/N_i$ obtained when mobile station $j_i$ (player $j_i$) which belongs to operator i performs direct transmission without using any relay station (RN) as a reference point of negotiation. Here, $T_i/N_i$ is obtained by dividing throughput $T_i$ of operator i obtained when direct transmission is performed by the number of mobile stations $N_i$ belonging to operator i. The aforementioned band allocation method in the band allocation determining section is formulated as shown in following expression 7.

(Expression 7)

$$\prod_{i=1}^{I}\prod_{j_i=1}^{N_i}\left(t_{ji}-\frac{T_i}{N_i}\right)=\max_{S}\prod_{i=1}^{I}\prod_{j_i=1}^{N_i}\left(x_{ji}-\frac{T_i}{N_i}\right) \quad [7]$$

In expression 7, I represents the number of operators. In addition, $x_{ji}$ represents a throughput of mobile station $j_i$ belonging to operator i and $t_{ii}$ represents a Nash bargaining solution.

In expression 7, since mobile station $j_i$ (player $j_i$) uses an average value of throughput $T_i/N_i$ when performing direct transmission without using any relay station (RN) as a reference point of negotiation, communication via the relay station is selected for only the mobile station that can obtain a throughput of an average value or higher via the relay station.

As another example, the band allocation determining section of the relay station may use a throughput obtained when mobile station $j_i$ (player $j_i$) belonging to operator i may perform direct transmission without using the relay station (RN) as reference point of negotiation $T_{ji}$ and may perform shared band allocation so as to maximize the product of amounts of throughput improvement $(x_{ji}-T_{ji})$. Here, $T_{ji}$ is a throughput of mobile station j, obtained when direct transmission is performed. The aforementioned band allocation method in the band allocation determining section is formulated as shown in following expression 8.

(Expression 8)

$$\prod_{i=1}^{I}\prod_{j_i=1}^{N_i}(t_{ji}-T_{ji})=\max_{S}\prod_{i=1}^{I}\prod_{j_i=1}^{N_i}(x_{ji}-T_{ji}) \quad [8]$$

In expression 8, I represents the number of operators. Furthermore, $x_{ji}$ represents a throughput of mobile station $j_i$ belong to operator i and $t_{ii}$ represents a Nash bargaining solution.

In expression 8, since throughput $T_{ji}$ obtained when mobile station $j_i$ (player $j_i$) performs direct transmission without using the relay station (RN) is used as a reference point of negotiation, communication via the relay station is more likely to be selected for even a low-throughput mobile station whose throughput improves via a relay station, which improves fairness among mobile stations.

In the present embodiment, when $(x_i-T_i)$ shown in expression 4 or $(x_{ji}-T_i/N_i)$ shown in expression 7 becomes 0 or minus, operator i may decide not to use any relay station.

Furthermore, a threshold Th may be provided in expression 4 and expression 7 and a condition of $(x_i-T_i)\geq Th$ or $(x_{ji}-T_i/N_i)\geq Th$ may be added as a condition on the right side of each expression. In this case, when the gain in using a relay station is very low, it is possible to prevent the operator or mobile station from using the relay station and allow an operator or mobile station having a higher gain in using the relay station.

[Embodiment 2]

Figure 6:
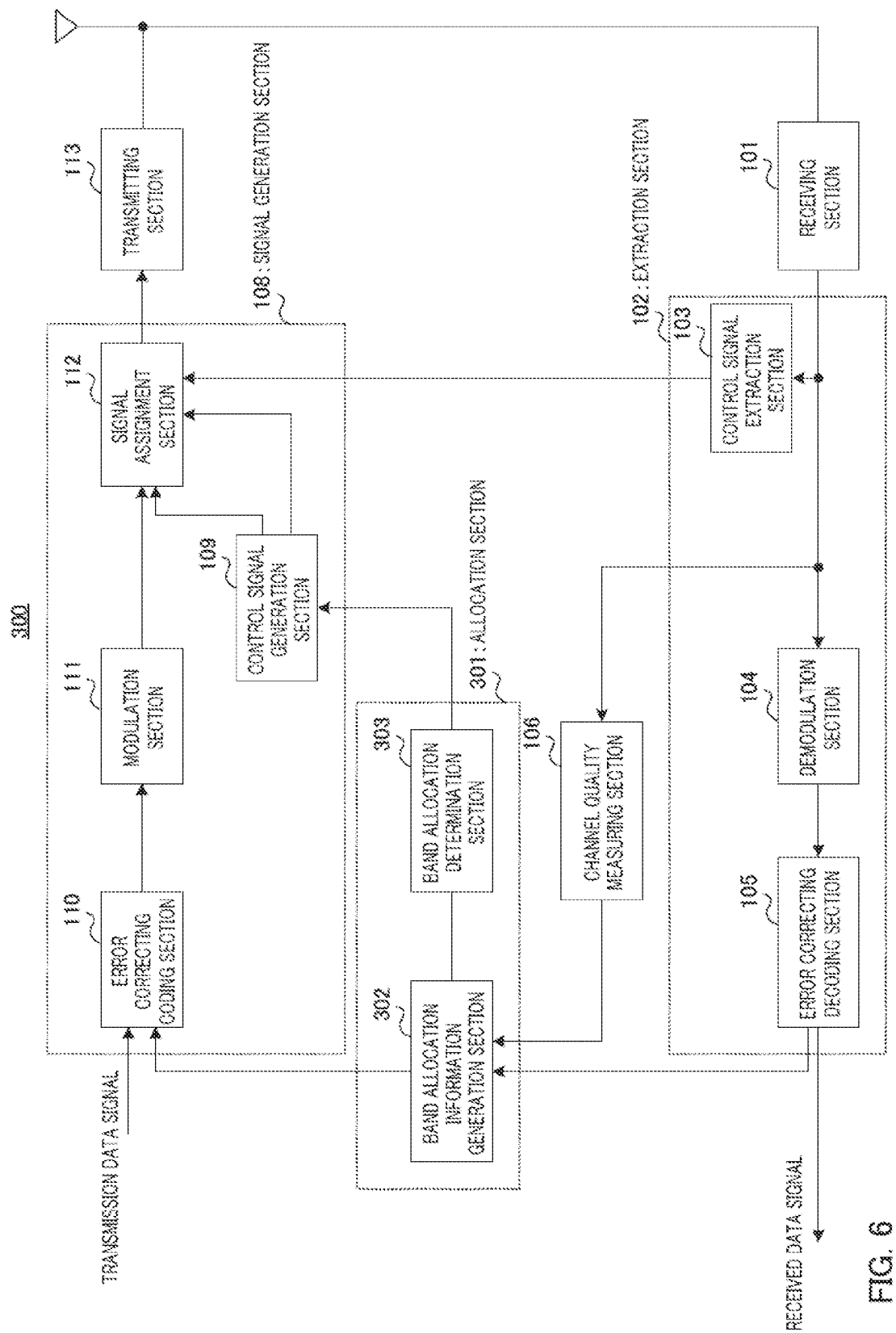
FIG. 6 is a block diagram illustrating a configuration of a relay station according to Embodiment 2 of the present invention.

FIG. 6 is a block diagram illustrating a configuration of relay station 300 according to the present embodiment.

In FIG. 6, allocation section 301 (band allocation information generation section 302) receives channel quality between eNB and RN of each operator, the number of active mobile stations per operator served by relay station 300 and information on an eNB-RN system bandwidth for each operator as input.

The eNB-RN system bandwidth and the number of mobile stations per operator served by relay station 300 are specified by a function of a higher layer (not shown) and the channel quality between eNB and RN is inputted from channel quality measuring section 106. As the channel quality between eNB and RN, RSRP can be used in LTE. That is, channel quality measuring section 106 measures RSRP as the channel quality between eNB and RN. Other parameters such as frequency utilization efficiency, SNR, SIR, SINR, CIR, CNR, CINR, RSSI, RSRQ, MCS level, receiving power, interference power, error rate, and transmission rate may be used as channel quality between eNB and RN. The average amount of traffic between RN and UE can be estimated from the number of active mobile stations served by relay station 300 (RN). The eNB-RN system bandwidth may differ from one operator to another.

Allocation section 301 generates information for determining an allocated band of each operator (band allocation information) in a shared band using the eNB-RN system bandwidth, the number of mobile stations served by relay station 300 and channel quality (e.g., RSRP) between each eNB and RN. Allocation section 301 also calculates an allocated band of each operator in the shared band based on the band allocation information. Allocation section 301 includes band allocation information generation section 302 and band allocation determining section 303.

Band allocation information generation section 302 generates information for determining an allocated band of each operator in the shared band (band allocation information). For example, band allocation information generation section 302 calculates a ratio among a plurality of operators relating to channel quality (RSRP) between eNB and RN, a ratio among a plurality of operators relating to the number of active mobile stations served by relay station 300, and a ratio among a plurality of operators relating to the eNB-RN system bandwidth. Band allocation information generation section 302 then generates band allocation information including a ratio among a plurality of operators relating to each parameter for each operator. Band allocation information generation section 302 outputs the generated band allocation information to band allocation determining section 303 and error correcting coding section 110.

Band allocation determining section 303 calculates a bandwidth for each operator in the shared band based on the band allocation information inputted from band allocation information generation section 302 (ratios among operators of channel quality between eNB and RN, the number of active mobile stations and eNB-RN system bandwidth) and outputs the calculate result to control signal generation section 109. For example, band allocation determining section 303 calculates a bandwidth for each operator in the shared band according to a predetermined calculation expression (which will be described later) commonly stored in relay station 300 and base station 400 (which will be described later).

The details of the band allocation processing in band allocation information generation section 302 and band allocation determining section 303 will be described later.

Figure 7:
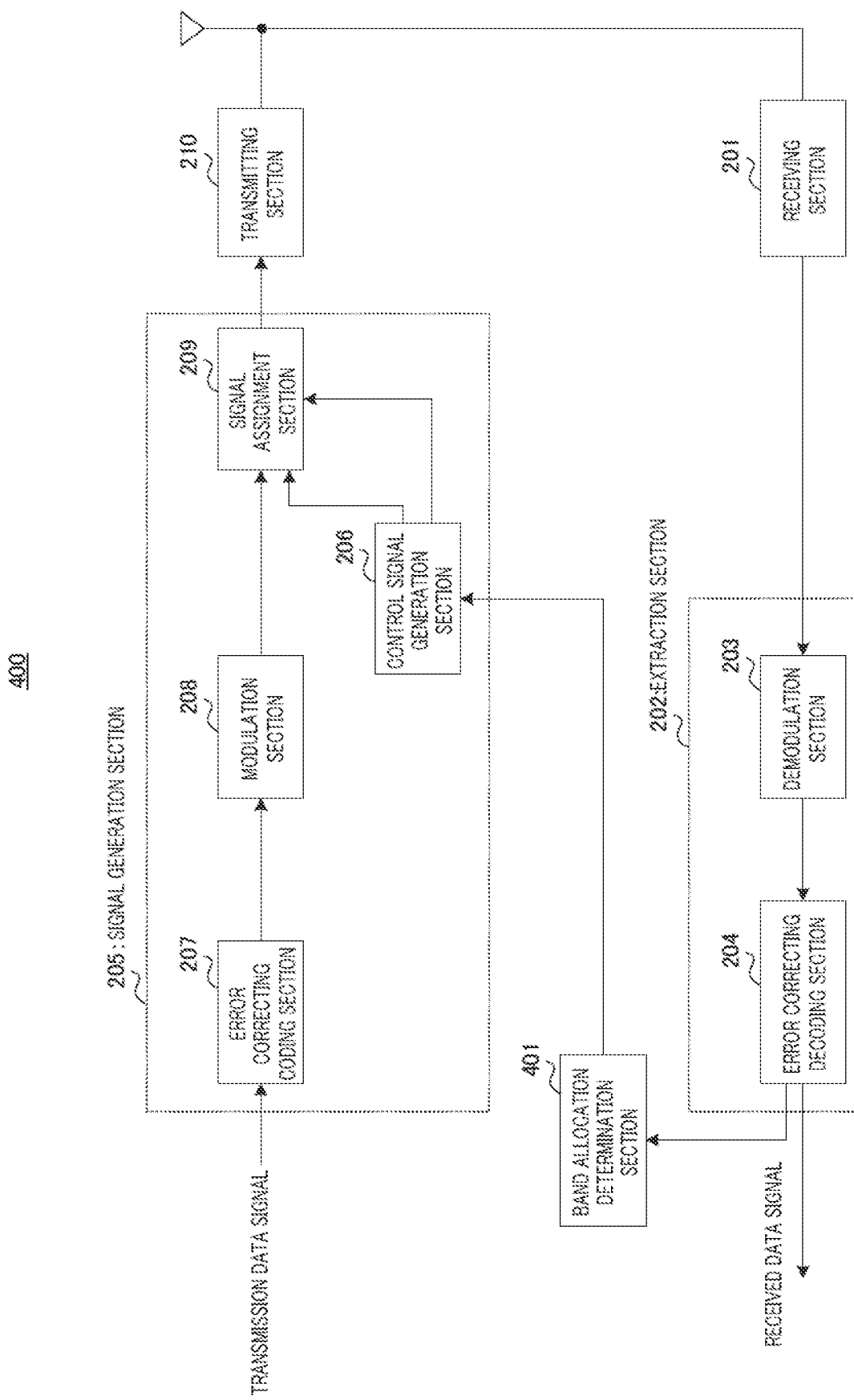
FIG. 7 is a block diagram illustrating a configuration of a base station according to Embodiment 2 of the present invention.

FIG. 7 is a block diagram illustrating a configuration of base station 400 according to the present embodiment. Base station 400 performs communication with relay station 300 that is shared among a plurality of operators and that relays signals communicated between base stations and mobile stations of the plurality of operators.

In FIG. 7, band allocation determining section 401 receives information from relay station 300 from error correcting decoding section 204. This information includes band allocation information for an operator to which base station 400 belongs to determine the band used in a shared band between RN and UE. The band allocation information also includes the ratio of the operator to all of the plurality of operators relating to channel quality between eNB and RN, the ratio of the operator to all of the plurality of operators relating to the number of active mobile stations served by relay station 300 and the ratio of the operator to all of the plurality of operators relating to the eNB-RN system bandwidth.

Like band allocation determining section 303 of relay station 300, band allocation determining section 401 calculates a bandwidth allocated to an operator to which base station 400 belongs in the shared band based on the band allocation information and outputs the calculation result to control signal generation section 206. For example, band allocation determining section 401 calculates the bandwidth for an operator to which base station 400 belongs in the shared band according to a calculation expression (which will be described later) commonly stored in relay station 300 and base station 400.

[Operations of Relay Station 300 and Base Station 400]

The present embodiment assumes that there is no information exchange among operators.

Relay station 300 generates information (band allocation information) for determining a bandwidth of a shared band allocated to each operator by processing information on channel quality between eNB and RN, the number of active mobile stations (UEs) served by relay station 300 and the eNB-RN system bandwidth. Base station 400 determines the bandwidth for the operator to which base station 400 belongs in the shared band using the information (band allocation information) processed in relay station 300.

More specifically, channel quality measuring section 106 of relay station 300 measures RSRP as channel quality between eNB and RN of each operator. For example, FIG. 8 shows measurement results of RSRP between eNB and RN. In FIG. 8, three operators (OP1, OP2, and OP3) will be described.

As shown in FIG. 8, relay station 300 acquires the number of active mobile stations ((active) UEs) served by relay station 300 and the system bandwidth in a channel between base station 400 and relay station 300 by a function of a higher layer (not shown).

Next, band allocation information generation section 302 calculates a ratio among operators regarding the measured RSRP between eNB and RN. For example, band allocation information generation section 302 calculates differences in dB values among operators regarding the RSRP between eNB and RN, then specifies the calculated difference in dB values as a true value and then calculates the ratio among operators. If the calculated difference [dB] of RSRP is x, the true value is calculated as the value of 10 raised to the power of (x/10). Furthermore, when calculating the difference of RSRP among operators, the lowest RSRP (channel quality) may be used as a reference.

More specifically, in FIG. 8, band allocation information generation section 302 uses the RSRP between eNB (OP3) and RN which is the lowest value (−105 dBm) as a reference. That is, as shown in FIG. 9, the difference in RSRP among operators in dB values is 10 dB for OP1 (between eNB (OP1) and RN), 5 dB for OP2 (between eNB (OP2) and RN) and 0 dB for OP3 (between (eNB (OP3) and RN, reference value). As shown in FIG. 9, the difference in the true value of RSRP among operators is 10 times for OP1 (between eNB (OP1) and RN), approximately 3 times for OP2 (between eNB (OP2) and RN), and 1 time for OP3 (between (eNB (OP3) and RN). Thus, as ratios among operators (OP1, OP2, and OP3) relating to RSRP between RN and UE, band allocation information generation section 302 sets 10/14 for OP1 (between eNB (OP1) and RN), 3/14 for OP2 (between eNB (OP2) and RN) and 1/14 for OP3 (between eNB (OP3) and RN).

Band allocation information generation section 302 also calculates a ratio among operators regarding the number of active mobile stations served by relay station 300 shown in FIG. 8. More specifically, as shown in FIG. 10, as the ratio among operators relating to the number of active mobile stations served by relay station 300, band allocation information generation section 302 sets 5/21 for OP1 (between eNB (OP1) and RN), 10/21 for OP2 (between eNB (OP2) and RN) and 6/21 for OP3 (between eNB (OP3) and RN).

Likewise, band allocation information generation section 302 calculates a ratio among operators relating to the eNB-RN system bandwidth shown in FIG. 8. More specifically, as shown in FIG. 10, as the ratio among operators relating to the eNB-RN system bandwidth, band allocation information generation section 302 sets 20/50 for OP1 (between eNB (OP1) and RN), 10/50 for OP2 (between eNB (OP2) and RN), and 20/50 for OP3 (between eNB (OP3) and RN).

Relay station 300 (transmitting section 210) transmits the ratios among operators of the respective parameters corresponding to the plurality of operators to base stations 400 of the plurality of operators respectively. That is, relay station 300 transmits, to each operator, only information relating to each operator. For example, in FIG. 10, relay station 300 transmits, to base station 400, only the ratio of OP1 (10/14) to all of the plurality of operators (OP1, OP2, and OP3) relating to RSRP between eNB and RN, the ratio of OP1 (5/21) to all of the plurality of operators (OP1, OP2, OP3) relating to the number of active mobile stations served by relay station 300 and the ratio of OP1 (20/50) to all of the plurality of operators (OP1, OP2, OP3) relating to the eNB-RN system bandwidth. The same applies to OP2 and OP3 shown in FIG. 10.

The configuration provides an advantage that a certain operator is notified of only information relating to the operator himself/herself and information relating to the operator is not transmitted to other operators. Since the information transmitted to each operator is a ratio among operators relating to each parameter (that is, information obtained by processing information of each operator), it is possible to hide information on other operators among operators. If the operators know that the number of operators is 2 in a case where the number of operators is 2, the information cannot be hidden, but if the operators do not know the number of operators, the information can be hidden.

Relay station 300 may change the frequency with which information is reported to each operator regarding each of the ratio of RSRP between eNB and RN, the ratio of the number of active mobile stations served by relay station 300 and the ratio of the eNB-RN system bandwidth. For example, if relay station 300 is a mobile relay, fluctuations of channel quality between eNB and RN may be most drastic compared to fluctuations of other parameters (the number of mobile stations, system bandwidth). On the other hand, since the eNB-RN system bandwidth is reported when base station 400 connected to relay station 300 (RN) is changed, there may be fewer changes than other parameters (channel quality, the number of mobile stations). Thus, as shown in FIG. 10, relay station 300 may set the highest frequency of reporting of the ratio of RSRP between eNB and RN, set the lowest frequency of reporting of the ratio of the eNB-RN system bandwidth and set a medium frequency of reporting of the ratio of the number of active mobile stations.

Next, band allocation determining section 303 of relay station 300 and band allocation determining section 401 of base station 400 calculate a bandwidth for each operator in the shared band using a ratio among operators of each parameter shown in FIG. 10.

Hereinafter, methods 1 to 3 for calculating a bandwidth allocated to each operator in a shared band will be described.

<Calculation Method 1>

Band allocation determining sections 303 and 401 calculate a band used between RN and UE for operator i according to following expression 9.

[9]

$$\text{Band used between RN and UE for operator } i = \text{RN-UE system band} \cdot (\text{ratio of } K1 \cdot \text{RSRP} + K2 \cdot \text{ratio of number of users} + K3 \cdot \text{ratio of system bandwidth})$$ (Expression 9)

In expression 9, K1, K2 and K3 are coefficients and are commonly set beforehand among operators.

For example, if K1+K2+K3=1 in expression 9, the entire system band (shared band) between RN and UE is allocated among operators and the frequency utilization efficiency increases.

The settings of K1, K2 and K3 make it possible to secure fairness among operators. For example, when the ratio of K2 to K1 and K3 (that is, weight with respect to the ratio of the number of users (the number of mobile stations) increases, it is possible to allocate a band in which the ratio of the number of users is better reflected even when the channel quality (RSRP) is low or the system bandwidth is narrow.

<Calculation Method 2>

Band allocation determining sections 303 and 401 calculate a band used between RN and UE for operator i according to following expression 10.

[10]

$$\text{Band used between RN and UE for operator } i = \text{RN system band} \cdot \text{ratio of number of users} + \text{amount of offset } \Delta$$ (Expression 10)

The amount of offset in expression 10 is determined according to following expression 11.

[11]

$$\text{Amount of offset } \Delta = K4 \cdot \log 10(\text{ratio of RSRP}) + K5 \cdot (\log 10(\text{ratio of system band}) + 1)$$ (Expression 11)

In expression 11, K4 and K5 are coefficients and are set commonly among operators beforehand. However, band allocation determining sections 303 and 401 need to make adjustment so that the bandwidth calculated according to expression 10 does not become a minus value or does not exceed the RN-UE system bandwidth depending on the value of the amount of offset.

<Calculation Method 3>

Band allocation determining sections 303 and 401 calculate a band used between RN and UE for operator i according to following expression 12.

[12]

$$\text{Band used between RN and UE for operator } i = \text{RN system band} \cdot (K6 \cdot \text{ratio of RSRP} + K7 \cdot \text{ratio of number of users})$$ (Expression 12)

In expression 12, K6 and K7 are coefficients and are commonly set beforehand among operators. If K6+K7=1, the entire system band (shared band) between RN and UE is allocated among operators and the frequency utilization efficiency increases. Since the ratio of system bandwidth is not used in expression 12, calculation method 3 is suitable when the system bandwidth is equal among operators.

Methods 1 to 3 for calculating a band allocated to each operator in the shared band have been described above.

Thus, according to the present embodiment, band allocation information generation section 302 of relay station 300 calculates a ratio among a plurality of operators relating to channel quality (quality of first channel) between eNB and RN, a ratio among a plurality of operators relating to the amount of traffic in the channel between RN and UE (the number of active mobile stations served by relay station 300) and a ratio among a plurality of operators relating to the eNB-RN system bandwidth. Band allocation determining section 303 of relay station 300 and band allocation determining section 401 of base station 400 determine band allocation of each operator in a shared band between RN and UE using the ratio relating to channel quality between eNB and RN, the ratio relating to the amount of traffic between RN and UE and the ratio relating to the eNB-RN system bandwidth.

That is, relay station 300 and base station 400 determine the bandwidth for each operator in the shared band shared among a plurality of operators between relay station 300 and a mobile station based on channel quality (here, RSRP) between relay station 300 and base station 400 of each operator and channel situation (here, amount of traffic) between relay station 300 and a mobile station of each operator.

With this configuration, it is possible to distribute the shared band among operators without waste in accordance with fluctuations in channel quality between eNB and RN of each operator as relay station 300 (e.g., mobile relay) moves. Moreover, distributing the shared band among operators in accordance with the channel situation (amount of traffic) between RN and UE makes it possible to appropriately determine the resource amount between base station 400 of each operator and relay station 300 and prevent the occurrence of any amount of traffic that relay station 300 cannot send to the mobile station (UE).

According to the present embodiment, relay station 300 determines band allocation of each operator in a shared band based on both the channel quality (RSRP) between eNB and RN and channel situation (amount of traffic) between RN and UE. Like Embodiment 1, this makes it possible to provide a degree of freedom for band allocation between RN and UE in accordance with both the channel quality between eNB and RN and channel situation (amount of traffic) between RN and UE and improve frequency utilization efficiency of the entire system. Thus, relay station 300 to which network sharing is applied can appropriately allocate, among a plurality of operators, a shared band shared among the plurality of operators and improve frequency utilization efficiency.

In Embodiment 1, information necessary to determine band allocation of operators in a shared band is gathered into relay station 100 (FIG. 3) and the bandwidth distribution result is reported to base station 200 (FIG. 4). In contrast, in the present embodiment, information necessary to determine band allocation of operators in the shared band is generated using parameters (RSRP, the number of mobile stations, system bandwidth) that can be acquired in relay station 300 and reported to base station 400. Compared to Embodiment 1, in the present embodiment, the necessity for notification of channel information from, for example, base station 400 to relay station 300 is eliminated. While Embodiment 1 requires signaling (information necessary for band allocation) from base station 200 or mobile station to relay station 100 and signaling from relay station 100 to base station 200 (band allocation result), the present embodiment requires only signaling (information necessary for band allocation) from relay station 300 to base station 400. Therefore, compared to Embodiment 1, it is possible to reduce the amount of signaling necessary to determine band allocation of each operator in a shared band.

Since information reported from relay station 300 to base station 400 is values obtained by processing information relating to each operator (here, ratio among operators), each operator cannot identify information relating to other operators (except, however, the case where the number of operators is 2). In this way, the present embodiment allows band allocation of operators in a shared band to be determined without exchanging information among operators and while hiding information relating to other operators.

In the present embodiment, channel quality between RN and UE may be added as a parameter to be used for band allocation calculation. In this case, the relay station (RN) averages channel quality between RN and UE for each operator, then performs calculations similar to calculations on the channel quality between eNB and RN shown in FIG. 9, calculates a ratio among operators relating to channel quality between RN and UE and notifies each operator of the ratio. In this case, the ratio of channel quality between RN and UE per operator is added to the calculation formula (e.g., expression 9)). The calculation expression in this case is shown in following expression 13.

[13]

Band used between RN and UE for operator $i$=RN-UE system band*($K1$*ratio of ($eNB$-RN)channel quality+$K2$*ratio of number of users+$K3$*ratio of system bandwidth +$K8$*ratio of RN-UE channel quality)   (Expression 13)

In expression 13, K8 is a coefficient and is set commonly among operators beforehand. Here, if K1+K2+K3+K8=1, the entire system band of RN is allocated among operators, providing high frequency utilization efficiency.

As a result of averaging channel quality between RN and UE for each operator, the average channel quality may be on the same level among operators. The case has been described in the present embodiment where the number of active mobile stations served by relay station 300 is used, and this can be said to be equivalent to weighting channel quality between RN and UE (values on the same level among operators) with the number of active mobile stations served by relay station 300.

[Embodiment 3]

The present embodiment will describe a case where a certain portion of a band used for a plurality of operators between RN and UE is secured for a specific operator and the remaining portion of the band other than the above-described portion of the band is shared among the plurality of operators.

More specifically, relay station 300 (FIG. 6) according to the present embodiment secures a specific band configured beforehand of a band used for the plurality of operators between RN and UE for a certain operator (hereinafter referred to as "operator 1"). Operator 1 is, for example, an operator having higher priority than other operators. The band to be secured for operator 1 (dedicated band for operator 1) may be notified from a base station of operator 1 (FIG. 7) or may be configured beforehand at the time of installation. That is, in the present embodiment, a shared band shared among a plurality of operators is a band other than the band preferentially allocated to at least one specific operator (operator 1) among a plurality of operators out of the band used for a plurality of operators between RN and UE. In other words, the above-described shared band is a band obtained by removing the band preferentially allocated to operator 1 from the band used for a plurality of operators between RN and UE.

It is assumed that the present embodiment is similar to Embodiment 2 in channel quality (e.g., ratio of RSRP) and the number of mobile stations (ratio of the number of active mobile stations served by relay station 300) of the information notified from relay station 300 (RN) to base station 400 (eNB) of each operator. The present embodiment is different from Embodiment 2 in notification of a ratio of a system bandwidth.

More specifically, relay station 300 calculates and transmits a ratio among a plurality of operators relating to a bandwidth of a band used for a plurality of operators between RN and UE so that the same notification method is used regardless of the presence or absence of an operator (e.g., operator 1) for which a band between RN and UE is preferentially secured. More specifically, relay station 300 calculates an allocated band of each operator regarding the band other than the dedicated band for operator 1 and then calculates the ratio among operators regarding the bandwidth of the entire band between RN and UE and notifies each operator of the ratio.

That is, in the present embodiment, the bandwidth for each operator in the shared band is calculated using the ratio of channel quality, the ratio of the number of mobile stations, and the ratio among operators regarding the bandwidth in the entire band between RN and UE calculated as described above.

Figure 11:
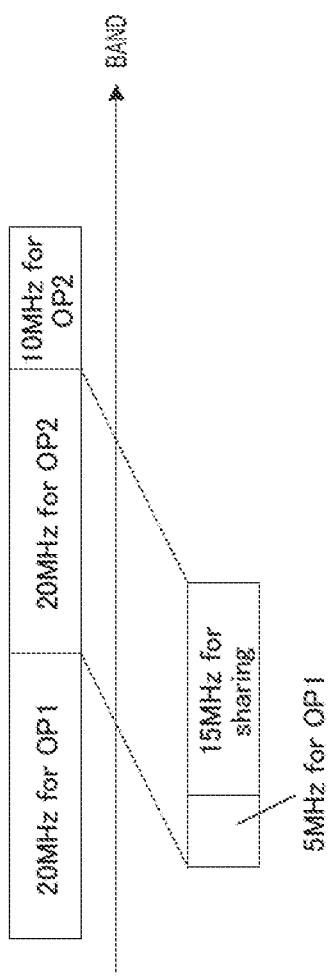
FIG. 11 is a diagram provided for describing band allocation according to Embodiment 3 of the present invention.

As an example, as shown in FIG. 11, suppose the system bandwidth for operator 1 with a dedicated band (preferential band) is 20 MHz, the system bandwidth for operator 2 with no dedicated band is 10 MHz and the system bandwidth of relay station 300 (RN) is 20 MHz. Furthermore, as shown in FIG. 11, 5 MHz of the system band of relay station 300 (RN) is secured as the dedicated band of operator 1. In this case, the ratio of the bandwidth for operator 1 to the system bandwidth (20 MHz) between RN and UE and the ratio of the bandwidth for operator 2 are calculated according to following expressions 14 and 15 respectively.

(Expression 14)

$$\frac{(20\text{ MHz}(RN\text{ band}) - 5\text{ MHz}(OP1\text{-occupied }RN\text{ band})) \cdot \frac{20\text{ MHz}(OP1\text{ band})}{30\text{ MHz}(\text{total of }OP1\text{ and }OP2\text{ bands})} + 5\text{ MHz}(OP1\text{-occupied }RN\text{ band})}{20\text{ MHz}(RN\text{ band})} \quad [14]$$

(Expression 15)

$$\frac{(20\text{ MHz}(RN\text{ band}) - 5\text{ MHz}(OP1\text{-occupied }RN\text{ band})) \cdot \frac{10\text{ MHz}(OP2\text{ band})}{30\text{ MHz}(\text{total of }OP1\text{ and }OP2\text{ bands})}}{20\text{ MHz}(RN\text{ band})} \quad [15]$$

That is, expression 14 and expression 15 are expressions for calculating ratios of system bandwidths between eNB and RN of operator 1 and operator 2 (OP1 band and OP2 band) in 15 MHz (shared band) obtained by subtracting 5 MHz occupied by operator 1 (OP1-occupied RN band) from 20 MHz (RN band) which is a band used for operators 1 and 2 between RN and UE, and then recalculating the ratio of the bandwidth for operator 1 and the ratio of the bandwidth for operator 2 to 20 MHz (RN band).

In FIG. 11, the ratios of system bandwidth between operator 1 and operator 2 are 20/30 and 10/30, respectively. Relay station 300 calculates the bandwidth for each operator in a shared band (15 MHz) in accordance with the ratio of system bandwidth among a plurality of operators (20/30 and 10/30 in FIG. 11). That is, in FIG. 11, the bandwidth for operator 1 in the shared band is 10 MHz (=15 MHz×20/30) and the bandwidth for operator 2 in the shared band is 15 MHz (=15 MHz×10/30). Next, relay station 300 calculates a ratio among a plurality of operators relating to the bandwidth (20 MHz) of the entire band between RN and UE using the calculated bandwidth for each operator in the shared band and a bandwidth of the band preferentially allocated to a specific operator (5 MHz for operator 1). That is, in FIG. 11, the ratio of the bandwidth for operator 1 to the bandwidth of the entire band between RN and UE (20 MHz) is 15/20 (=(10 MHz+5 MHz)/20 MHz) and the ratio of the bandwidth for operator 2 to the bandwidth of the entire band between RN and UE (20 MHz) is 5/20 (=5 MHz/20 MHz).

Thus, even when part of the band used between RN and UE for a plurality of operators is secured for a certain operator, it is possible to use the same signaling from relay station 300 to base station 400 as the signaling in Embodiment 2 by using the calculation expressions shown in expression 14 and expression 15. That is, the same signaling can be used for each operator irrespective of the presence or absence of operators for which the band between RN and UE is preferentially secured. Thus, according to the present embodiment, it is possible, for example, to preferentially allocate resources to an operator which owns relay station 300 or an operator which preferentially secures a band under contract and hide the presence or absence of a setting of a preferential band over a certain operator and percentage occupied as a preferential band from other operators including operators which have not preferentially secured the band.

Relay station 300 may further set a dedicated band for an operator having lower priority than operator 1 (hereinafter, referred to as operator 3). In this case, for example, a band minimally available to operator 3 is secured by a contract between operator 1 and operator 3. Even in this case as well as the present embodiment, the remaining portion of the band between RN and UE other than the band secured for operator 1 and operator 3 is shared among a plurality of operators.

[Other Embodiments]

[1] The embodiments have been described with a case where a band between RN and UE is shared among operators. However, in the present invention, the band between RN and UE may be shared between eNBs of the same operator. In such a case, above-described "i" does not represent an operator number but represents an eNB number.

[2] In Embodiments 2 and 3, relay station 300 (RN) may calculate a bandwidth between RN and UE and notify each operator (base station 400) of the calculation result (bandwidth between RN and UE). For example, regarding band 20 MHz between RN and UE, relay station 300 may notify operator 1 of "7 MHz" and notify operator 2 of "13 MHz." Even in such a case, since relay station 300 originally stores information necessary to calculate a bandwidth between RN and UE, relay station 300 need not increase signaling to calculate the bandwidth. Moreover, the amount of signaling necessary for notifying the calculation result can be reduced compared to Embodiment 2 or 3.

[3] The embodiments have been described with a case where each operator is notified of the bandwidth between RN and UE allocated to each operator, but the information notified to each operator is not limited to the bandwidth. For example, the relay station may also notify each operator of the amount of traffic, buffer size or ratio (percentage) instead of the bandwidth between RN and UE.

More specifically, since it is not possible to correctly estimate a gain of MU (Multi User)-MIMO of UE (OP1) and UE (OP2) shown in, for example, FIG. 5 with a bandwidth, the relay station may notify each operator of the amount of traffic (e.g., x[Mbsp]) calculated from a bandwidth and a gain of MU-MIMO instead of the bandwidth.

Alternatively, the relay station (RN) may divide the size of a reception buffer in the relay station (RN reception buffer size (total number of soft channel bits)) which is determined by the category of the relay station (RN) for each operator and notify the operator of the buffer size allocated to each operator. The operator transmits data based on the notified RN reception buffer size so that the buffer does not overflow. In this case, the relay station (RN) notifies the operator of the amount of data stored in the buffer (storage amount of the buffer). When the relay station (RN) notifies the operator of 1 bit (e.g., "1" when the storage amount of the buffer increases or "0" when the storage amount of the buffer decreases) linked with an increase/decrease of the storage amount of the buffer of the reception buffer, regular feedback with the amount of notification of 1 bit is all that required.

Alternatively, instead of the bandwidth value itself, the relay station (RN) may notify each operator of the ratio of a bandwidth to be allocated to the operator to the entire bandwidth. For example, regarding a band of 20 MHz, if the relay station notifies operator 1 that the ratio is 40% and notifies operator 2 that the ratio is 60%, operator 1 then recognizes that 8 MHz (20 MHz*40%) of the band between RN and UE is available and operator 2 recognizes that 12 MHz (20 MHz*60%) of the band between RN and UE is available.

[4] Although the embodiment above have been described with a mobile relay station (mobile relay), the present invention is likewise applicable to a fixed relay station as well. In the case of a fixed relay station, channel quality between eNB and RN changes less frequently. Alternatively, if an environment change is small, channel quality between eNB and RN does not change considerably. For this reason, in the case of a fixed relay station, it is possible to reduce the frequency of measuring or reporting channel quality between eNB and RN compared to a mobile relay station.

[5] In Embodiments 2 and 3, the configuration capable of preventing information leakage among operators has been described. However, when information can be shared among operators, the values shown in FIG. 8 (measured values, values acquired from a higher layer) may be reported from the relay station to the base station as is without calculating the ratio among operators as shown in FIG. 10. In order to allow any base station or relay station to calculate a band to be allocated to an operator, both the relay station and base station may include the aforementioned band allocation determining section. In this case, the apparatus to perform calculation may be made selectable so that a base station or relay station having more processing capacity is selected to perform band calculation.

[6] Embodiments 2 and 3 have been described with a case where the ratio of each parameter among operators is reported from a relay station (RN) to a base station (eNB) of each operator. However, the relay station may map the information of the above-described ratio using, for example, the table in FIG. 12 to thereby report the compressed information. For example, in FIG. 12, when an actually measured value (ratio [%]) relating to a certain parameter of a certain operator ranges from 28 to 40[%], the relay station transmits bit "2" to the base station. The base station then calculates the bandwidth using ⅓ (33.3%) as a value corresponding to bit "2" (representative value). This makes it possible to reduce the amount of signaling.

[7] Although the embodiments have been described with examples where the present invention is configured by hardware, the present invention can also be implemented by software in concert with hardware.

Each function block employed in the description of the aforementioned embodiments may typically be implemented as an LSI constituted by an integrated circuit. These functional blocks may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI as a result of the advancement of semiconductor technology or a technology derivative of semiconductor technology, it is naturally also possible to carry out function block integration using this technology. Application of biotechnology is also possible.

The disclosure of Japanese Patent Application No. 2011-243347, filed on Nov. 7, 2011, including the specification, drawings, and abstract, is incorporated herein by reference in its entirety.

INDUSTRIAL APPLICABILITY

The present invention is useful in that it is possible to improve the frequency utilization efficiency in a relay station to which network sharing is applied.

REFERENCE SIGNS LIST

100, 300 Relay station
200, 400 Base station
500 Communication apparatus
101, 201 Receiving section
102, 202 Extraction section
103 Control signal extraction section
104, 203 Demodulation section
105, 204 Error correcting decoding section
106 Channel quality measuring section
107, 303, 401, 501 Band allocation determining section
108, 205, 502 Signal generation section
109, 206 Control signal generation section
110, 207 Error correcting coding section
111, 208 Modulation section
112, 209 Signal Assignment section
113, 210 Transmitting section
301 Allocation section
302 Band allocation information generation section

The invention claimed is:

1. A relay station that is shared among a plurality of operators and that relays signals communicated between base stations and mobile stations of the plurality of operators, the relay station comprising:
a band allocation determining section that calculates a difference between a first throughput and a second throughput for each of the plurality of operators, the first throughput being a throughput for communication between the base station and the mobile station via at least the relay station, and the second throughput being a throughput for communication between the base station and the mobile station without using the relay station, and determines a bandwidth for each of the operators in a shared band so as to maximize a product of the respective differences for the respective operators, the shared band being a band used between the relay station and the mobile stations and being shared among the plurality of operators; and
a signal generation section that generates signals of the plurality of operators based on the bandwidths for the respective operators in the shared band.

2. The relay station according to claim 1, wherein:
the band allocation determining section determines the bandwidth $e_i$ for operator i (where i=1, . . . ,I, and I is the number of the operators) according to $$\max_S \prod_{i=1}^{I} (x_i - T_i)$$

$$x_i = \eta_{eUi} \cdot b_{eUi} + \min(\eta_{eRi} \cdot b_{eRi}, \eta_{RUi} \cdot e_i)$$

$$T_i = \eta_{eUi} \cdot B_i$$

where $T_i$ represents the first throughput for operator i, $x_i$ represents the second throughput for operator i, $\eta_{eUi}$ represents frequency utilization efficiency between the base station and the mobile station of operator i, $\eta_{eRi}$ represents frequency utilization efficiency between the base station and the relay station of operator i, $\eta_{RUi}$ represents frequency utilization efficiency between the relay station and the mobile station of operator i, $b_{eUi}$ represents a bandwidth allocated between the base station and the mobile station of operator i, $b_{eRi}$ represents a bandwidth allocated between the base station and the relay station of operator i, $B_i$ represents a dedicated bandwidth allocatable to a link between the base station and the mobile station of operator i, and S represents an allocation bandwidth vector including $b_{eUi}$, $b_{eRi}$ and $e_i$.

3. The relay station according to claim 1, further comprising:
a calculation section that calculates a first ratio among the plurality of operators relating to quality of a first channel between the base station and the relay station and calculates a second ratio among the plurality of operators relating to a traffic amount in a second channel between the relay station and the mobile station; and
a transmitting section that transmits the first ratio and the second ratio corresponding to each of the plurality of operators to the base station of a corresponding one of the plurality of operators.

4. The relay station according to claim 3, wherein the bandwidth for each of the operators in the shared band is calculated using the first ratio and the second ratio.

5. The relay station according to claim 3, wherein the amount of traffic in the second channel is estimated from a number of active mobile stations served by the relay station.

6. The relay station according to claim 3, wherein:
the calculation section further calculates a third ratio among the plurality of operators relating to a system bandwidth between the base stations and the relay station; and
the transmitting section transmits the first ratio, the second ratio and the third ratio corresponding to each of the plurality of operators to the base station of a corresponding one of the plurality of operators.

7. The relay station according to claim 3, wherein:
the shared band is a band obtained by removing a band preferentially allocated to at least one specific operator among the plurality of operators from a specific band used for the plurality of operators between the relay station and the mobile stations;
the calculation section further calculates a bandwidth for each of the operators in the shared band in accordance with a ratio of a system bandwidth among the plurality of operators, and calculates a fourth ratio among the plurality of operators relating to a bandwidth of the specific band using the calculated bandwidth for each of the operators in the shared band and a bandwidth of the band preferentially allocated to the specific operator; and
the transmitting section transmits the first ratio, the second ratio and the fourth ratio corresponding to each of the plurality of operators to the base station of a corresponding one of the plurality of operators.

8. The relay station according to claim 1, further comprising a channel quality measuring section that measures quality of a first channel between the base station and the relay station using a signal from the base station and measures quality of a second channel between the relay station and the mobile station using a signal from the mobile station.

9. The relay station according to claim 1, further comprising an extraction section that extracts quality of a first channel between the base station and the relay station from a signal from the base station and extracts quality of a second channel between the relay station and the mobile station from a signal from the mobile station.

10. A base station that communicates with a relay station configured to relay signals communicated between base stations and mobile stations of a plurality of operators and to be shared among the plurality of operators, the base station comprising:
a band allocation determining section that calculates a difference between a first throughput and a second throughput for each of the plurality of operators, the first throughput being a throughput for communication between the base station and the mobile station via at least the relay station, and the second throughput being a throughput for communication between the base station and the mobile station without using the relay station, and determines a bandwidth for each of the operators in a shared band so as to maximize a product of the respective differences for the respective operators, the shared band being a band used between the relay station and the mobile stations and being shared among the plurality of operators; and
a signal generation section that generates signals based on the bandwidths for the respective operators in the shared band.

11. The base station according to claim 10, wherein the bandwidth for each of the operators in the shared band is calculated using a first ratio among the plurality of operators relating to quality of a first channel between the base station and the relay station and a second ratio among the plurality of operators relating to an amount of traffic in a second channel between the relay station and the mobile station.

12. The base station according to claim 11, wherein the amount of traffic in the second channel is estimated from a number of active mobile stations served by the relay station.

13. The base station according to claim 10, wherein the bandwidth for each of the operators in the shared band is calculated using a first ratio among the plurality of operators relating to quality of a first channel between the base station and the relay station, a second ratio among the plurality of operators relating to an amount of traffic in a second channel between the relay station and the mobile station, and a third ratio among the plurality of operators relating to a system bandwidth between the base stations and the relay station.

14. The base station according to claim 10, wherein:
the shared band is a band obtained by removing a band preferentially allocated to at least one specific operator among the plurality of operators from a specific band used for the plurality of operators between the relay station and the mobile stations; and
the bandwidth for each of the operators in the shared band is calculated using a first ratio among the plurality of operators relating to the quality of the first channel, a second ratio among the plurality of operators relating to an amount of traffic in the second channel, and a fourth ratio among the plurality of operators relating to a bandwidth of the specific band calculated using the bandwidth for each of the operators in the shared band and a bandwidth of the band preferentially allocated to the specific operator, in accordance with the ratio of the system bandwidth among the plurality of operators.

15. A method for allocating a band used to relay signals communicated between base stations and mobile stations of a plurality of operators, the method comprising:
calculating a difference between a first throughput and a second throughput for each of the plurality of operators, the first throughput being a throughput for communication between the base station and the mobile station via at least the relay station, and the second throughput being a throughput for communication between the base station and the mobile station without using the relay station;

determining a bandwidth for each of the operators in a shared band so as to maximize a product of the respective differences for the respective operators the shared band being a band used between the relay station and the mobile stations and being shared among the plurality of operators; and generating signals of the plurality of operators based on the bandwidths for the respective operators in the shared band.

* * * * *